(12) United States Patent
Zhang

(10) Patent No.: US 11,281,861 B2
(45) Date of Patent: Mar. 22, 2022

(54) METHOD OF CALCULATING RELEVANCY, APPARATUS FOR CALCULATING RELEVANCY, DATA QUERY APPARATUS, AND NON-TRANSITORY COMPUTER-READABLE STORAGE MEDIUM

(71) Applicant: BOE Technology Group Co., Ltd., Beijing (CN)

(72) Inventor: Zhenzhong Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/330,545

(22) PCT Filed: Jun. 19, 2018

(86) PCT No.: PCT/CN2018/091822
§ 371 (c)(1),
(2) Date: Mar. 5, 2019

(87) PCT Pub. No.: WO2019/140863
PCT Pub. Date: Jul. 25, 2019

(65) Prior Publication Data
US 2021/0334464 A1   Oct. 28, 2021

(30) Foreign Application Priority Data

Jan. 22, 2018   (CN) .......................... 201810060942.7

(51) Int. Cl.
*G06F 40/30* (2020.01)
*G06F 16/33* (2019.01)
(Continued)

(52) U.S. Cl.
CPC ............ *G06F 40/30* (2020.01); *G06F 16/338* (2019.01); *G06F 16/3344* (2019.01);
(Continued)

(58) Field of Classification Search
CPC .............................. G06F 40/30; G06F 40/194
See application file for complete search history.

(56) References Cited

U.S. PATENT DOCUMENTS 6,560,620 B1 * 5/2003 Ching .................. G06F 40/194
715/229
6,658,626 B1 * 12/2003 Aiken .................. G06F 40/289
715/205

(Continued)

FOREIGN PATENT DOCUMENTS

| CN | 105138647 A | 12/2015 |
|----|-------------|---------|
| CN | 107436864 A | 12/2017 |

(Continued)

OTHER PUBLICATIONS

Chen, E. et al., "Review of Studies on Text Similarity Measures", Data Analysis and Knowledge Discovery, 2017, vol. 6, English translation of Abstract is attached.

(Continued)

*Primary Examiner* — Samuel G Neway
(74) *Attorney, Agent, or Firm* — Intellectual Valley Law, P.C.

(57) ABSTRACT

The present application provides a method of calculating relevancy between a first text and a second text. The method includes respectively mapping the first text and the second text to vectors; determining a similar part and a dissimilar part between the first text and the second text based on the vectors; and calculating the relevancy between the first text and the second text using both the similar part and the dissimilar part.

15 Claims, 5 Drawing Sheets

(51) Int. Cl.
  *G06F 16/338* (2019.01)
  *G06F 40/279* (2020.01)
  *G06F 40/194* (2020.01)
  *G06N 3/08* (2006.01)
(52) U.S. Cl.
  CPC .......... *G06F 40/194* (2020.01); *G06F 40/279* (2020.01); *G06N 3/08* (2013.01)

(56) References Cited

U.S. PATENT DOCUMENTS

| | | | |
|---|---|---|---|
| 6,990,628 B1* | 1/2006 | Palmer | G06F 40/194 715/234 |
| 2002/0129015 A1 | 9/2002 | Caudill et al. | |
| 2004/0093564 A1* | 5/2004 | Kumhyr | G06F 40/197 715/229 |
| 2008/0114750 A1 | 5/2008 | Saxena et al. | |
| 2008/0244355 A1* | 10/2008 | Bhandari | G06F 40/194 714/755 |
| 2009/0024606 A1* | 1/2009 | Schilit | G06F 40/134 |
| 2009/0125805 A1 | 5/2009 | Ananthanarayanan et al. | |
| 2009/0240498 A1* | 9/2009 | Yih | G06F 40/194 704/239 |
| 2010/0223671 A1* | 9/2010 | Tsuda | G06F 16/93 726/26 |
| 2012/0191740 A1* | 7/2012 | Moehrle | G06F 40/194 707/758 |
| 2013/0191410 A1* | 7/2013 | Zhou | G06F 16/24558 707/769 |
| 2014/0101171 A1* | 4/2014 | Danielyan | G06F 40/268 707/749 |
| 2015/0212993 A1 | 7/2015 | Farchi et al. | |
| 2015/0278200 A1* | 10/2015 | He | G06F 40/194 704/2 |
| 2016/0196342 A1* | 7/2016 | Kim | G06F 40/194 707/728 |
| 2017/0061250 A1 | 3/2017 | Gao et al. | |
| 2017/0063913 A1* | 3/2017 | Hu | G06F 21/51 |
| 2017/0364495 A1* | 12/2017 | Srinivasan | G06K 9/00483 |
| 2018/0240012 A1* | 8/2018 | Bhatt | G06N 3/0445 |

FOREIGN PATENT DOCUMENTS

| | | |
|---|---|---|
| JP | 2005063220 A | 3/2005 |
| WO | 2017084267 A1 | 5/2017 |

OTHER PUBLICATIONS

First Office Action in the Indian Patent Application No. 202047022207, dated Jul. 22, 2021.
The Extended European Search Report in the European Patent Application No. 18901142.2, dated Aug. 27, 2021.
Sangeetha S. et al., "Recognising Sentence Similarity Using Similitude and Dissimilarity Features", International Journal of Advanced Intelligence Paradigms, vol. 4, No. 2, Jan. 1, 2012, p. 120, XP055830774, ISSN:1755-0386, DOI: 10.1504/IJAIP.2012.048141.
Long Qiu et al., "Paraphrase Recognition via Dissimilarity Significance Classification", Proceeding of the 2006 Conference on Empirical Methods in Natural Language Processing, EMNLP '06, Association for Computational Linguistics, Morristown, NJ, USA, Jul. 22, 2006, pp. 18-26, XP058271250, ISBN: 978-1-932432-73-2.
Tobias Christiani et al., "Set Similarity Search Beyond MinHash", arxiv. org, Cornell Univeristy Library, 201 Olin Library Cornell University Ithaca, NY 14853, Dec. 22, 2016, XP080742487, DOI: 10.1145/3055399.305543.
First Office Action in the Korean Patent Application No. 20207014877, dated Sep. 24, 2021; English translation attached.

* cited by examiner

METHOD OF CALCULATING RELEVANCY, APPARATUS FOR CALCULATING RELEVANCY, DATA QUERY APPARATUS, AND NON-TRANSITORY COMPUTER-READABLE STORAGE MEDIUM

CROSS-REFERENCE TO RELATED APPLICATION

This application is a national stage application under 35 U.S.C. § 371 of International Application No. PCT/CN2018/091822, filed Jun. 19, 2018, which claims priority to Chinese Patent Application No. 201810060942.7, filed Jan. 22, 2018, the contents of which are incorporated by reference in the entirety.

TECHNICAL FIELD

The present invention relates to data processing technology, more particularly, to a method of calculating relevancy, an apparatus for calculating relevancy, a data query apparatus, and a non-transitory computer-readable storage medium.

BACKGROUND

With the development of internet and big data technology, a huge amount of information becomes available. Various search engines have been developed to facilitate a user to search for useful information based on a keyword entry. For example, a medical professional can search various medical literatures, books, and websites on the internet based on a search query. A patient may seek health-related information on health information websites.

SUMMARY

In one aspect, the present invention provides a method of calculating relevancy between a first text and a second text, comprising respectively mapping the first text and the second text to vectors; determining a similar part and a dissimilar part between the first text and the second text based on the vectors; and calculating the relevancy between the first text and the second text using both the similar part and the dissimilar part.

Optionally, determining the similar part and the dissimilar part comprises determining a similar part and a dissimilar part of the first text; and determining a similar part and a dissimilar part of the second text.

Optionally, subsequent to respectively mapping the first text and the second text to vectors, further comprising performing dimension reduction on the vectors, thereby representing the first text and the second text respectively using low-dimension dense vectors.

Optionally, dimension reduction is performed using one or more methods selected from a group consisting of Word2Vec, Sentence2Vec, and Doc2Vec.

Optionally, determining the similar part and dissimilar part comprises performing a semantic content analysis based on the first text and the second text.

Optionally, the semantic content analysis comprises performing a sematic matching process between the first text and the second text thereby obtaining a semantic overlay between the first text and the second text.

Optionally, performing the sematic matching process comprises reconstructing a vector of a word in the first text using word vectors of the second text; and calculating a semantic overlay based on a result of the reconstructing.

Optionally, determining the similar part and dissimilar part comprises performing a semantics decomposition on the first text and the second text.

Optionally, the semantic overlay is calculated based on Equation (1):

$$\min(\|S_i - \Sigma_{j=1}^m \alpha_{i,j} \times T_j\|^2 + \lambda \Sigma_{j=1}^m \alpha_{i,j}^2) \qquad (1);$$

wherein $S_i$ is a d×1 column vector of the first text; $T_j$ is a d×1 column vector of the second text; $\alpha_{i,j}$ is parameter for semantic overlay calculation; $\lambda > 0$; and $\lambda$ is a positive real number.

Optionally, the similar part of the first text is calculated based on $$S_i' = \sum_{j=1}^m A_{i,j} \times T_j;$$

wherein $S_i'$ represents the similar part of the first text, and $A_{i,j}$ is a matrix of $\alpha_{i,j}$; and $S_i - S_i'$ represents the dissimilar part of the first text.

Optionally, the semantic overlay is calculated based on Equation (2):

$$\min(\|T_i - \Sigma_{j=1}^m \beta_{i,j} \times S_j\|^2 + \lambda \Sigma_{j=1}^m \beta_{i,j}^2) \qquad (2);$$

wherein $T_i$ is a d×1 column vector of the second text; $S_j$ is a d×1 column vector of the first text; $\beta_{i,j}$ is parameter for semantic overlay calculation; $\lambda > 0$; and $\lambda$ is a positive real number.

Optionally, the similar part of the second text is calculated based on $$T_j' = \sum_{j=1}^m A_{i,j} \times S_j;$$

wherein $T_j'$ represents the similar part of the second text, and $A_{i,j}$ is a matrix of $\beta_{i,j}$; and $T_j - T_j'$ represents the dissimilar part of the second text.

Optionally, the relevancy between the first text and the second text is calculated using a Recurrent Neural Network using the similar part and the dissimilar part between the first text and the second text as input.

Optionally, the input comprises a similar part and a dissimilar part of the first text; and a similar part and a dissimilar part of the second text.

Optionally, the method further comprises training the Recurrent Neural Network using a sample data represented as (Ss, Ts, L), wherein Ss stands for a first sample text, Ts stands for a second sample text, and L represents a sample relevancy.

Optionally, training the Recurrent Neural Network further comprises assigning a first value of granularity to a first relevancy in a first range and a second value of granularity to a second relevancy in a second range.

In another aspect, the present invention provides an apparatus for calculating relevancy between a first text and a second text, comprising a memory; and one or more processors; wherein the memory and the one or more processors are connected with each other; the memory stores computer-executable instructions for controlling the one or more processors to respectively map the first text and the second text to vectors; determine a similar part and a dissimilar part between the first text and the second text based on the vectors; and calculate the relevancy between the first text and the second text using both the similar part and the dissimilar part.

Optionally, the memory stores computer-executable instructions for controlling the one or more processors to determine a similar part and a dissimilar part of the first text; and determine a similar part and a dissimilar part of the second text.

Optionally, the memory further stores computer-executable instructions for controlling the one or more processors to, subsequent to respectively mapping the first text and the second text to vectors, perform dimension reduction on the vectors, thereby representing the first text and the second text respectively using low-dimension dense vectors.

Optionally, dimension reduction is performed using one or more methods selected from a group consisting of Word2Vec, Sentence2Vec, and Doc2Vec.

Optionally, the memory further stores computer-executable instructions for controlling the one or more processors to perform a semantic content analysis based on the first text and the second text thereby determining the similar part and dissimilar part.

Optionally, the memory further stores computer-executable instructions for controlling the one or more processors to perform a sematic matching process between the first text and the second text thereby obtaining a sematic overlay between the first text and the second text.

Optionally, the memory further stores computer-executable instructions for controlling the one or more processors to reconstruct a vector of a word in the first text using word vectors of the second text, and calculate a semantic overlay based on a result of reconstruction.

Optionally, the memory further stores computer-executable instructions for controlling the one or more processors to perform a semantics decomposition on the first text and the second text thereby determining the similar part and dissimilar part.

Optionally, the semantic overlay is calculated based on Equation (1):

$$\min\left(\left\|S_i - \sum_{j=1}^{m}\alpha_{i,j}\times T_j\right\|^2 + \lambda\sum_{j=1}^{m}\alpha_{i,j}^2\right); \quad (1)$$

wherein $S_i$ is a d×1 column vector of the first text; $T_j$ is a d×1 column vector of the second text; $\alpha_{i,j}$ is parameter for semantic overlay calculation; $\lambda>0$; and $\lambda$ is a positive real number.

Optionally, the similar part of the first text is calculated based on $$S'_i = \sum_{j=1}^{m} A_{i,j} \times T_j;$$

wherein $S'_i$ represents the similar part of the first text, and $A_{i,j}$ is a matrix of $\alpha_{i,j}$; and $S_i$-$S'_i$ represents the dissimilar part of the first text.

Optionally, the semantic overlay is calculated based on Equation (2):

$$\min(\|T_i - \Sigma_{j=1}^{m}\beta_{i,j}\times S_j\|^2 + \lambda\Sigma_{j=1}^{m}\beta_{i,j}^2) \quad (2);$$

wherein $T_i$ is a d×1 column vector of the second text; $S_j$ is a d×1 column vector of the first text; $\beta_{i,j}$ is parameter for semantic overlay calculation; $\lambda>0$; and $\lambda$ is a positive real number.

Optionally, the similar part of the second text is calculated based on $$T'_j = \sum_{j=1}^{m} A_{i,j} \times S_j;$$

wherein $T'_j$ represents the similar part of the second text, and $A_{i,j}$ is a matrix of $\beta_{i,j}$, and $T_j$-$T'_j$ represents the dissimilar part of the second text.

Optionally, the apparatus further comprises a Recurrent Neural Network using the similar part and the dissimilar part of the first text and the second text as input to calculate the relevancy between the first text and the second text.

Optionally, the input comprises a similar part and a dissimilar part of the first text; and a similar part and a dissimilar part of the second text.

Optionally, the memory further stores computer-executable instructions for controlling the one or more processors to train the Recurrent Neural Network using a sample data represented as (Ss, Ts, L), wherein Ss stands for a first sample text, Ts stands for a second sample text, and L represents a sample relevancy.

Optionally, the memory further stores computer-executable instructions for controlling the one or more processors to assign a first value of granularity to a first relevancy in a first range and a second value of granularity to a second relevancy in a second range.

In another aspect, the present invention provides a data query apparatus, comprising the apparatus for calculating relevancy described herein.

In another aspect, the present invention provides a data query method, comprising calculating relevancy between a first text and a second text according to the method of calculating relevancy described herein, the second text being a text selected from a plurality of potential target texts; ranking the plurality of potential target texts based on calculation of relevancy between the plurality of potential target texts and the first text; and selecting a target text out of the plurality of potential target texts based on a resulting of ranking of the plurality of potential target texts.

In another aspect, the present invention provides a non-transitory computer-readable storage medium storing computer-readable instructions, the computer-readable instructions being executable by a processor to cause the processor to perform respectively map a first text and a second text to vectors; determine a similar part and a dissimilar part between the first text and the second text based on the vectors; and calculate a relevancy between a first text and a second text using both the similar part and the dissimilar part.

BRIEF DESCRIPTION OF THE FIGURES

The following drawings are merely examples for illustrative purposes according to various disclosed embodiments and are not intended to limit the scope of the present invention.

DETAILED DESCRIPTION

Figure 1:
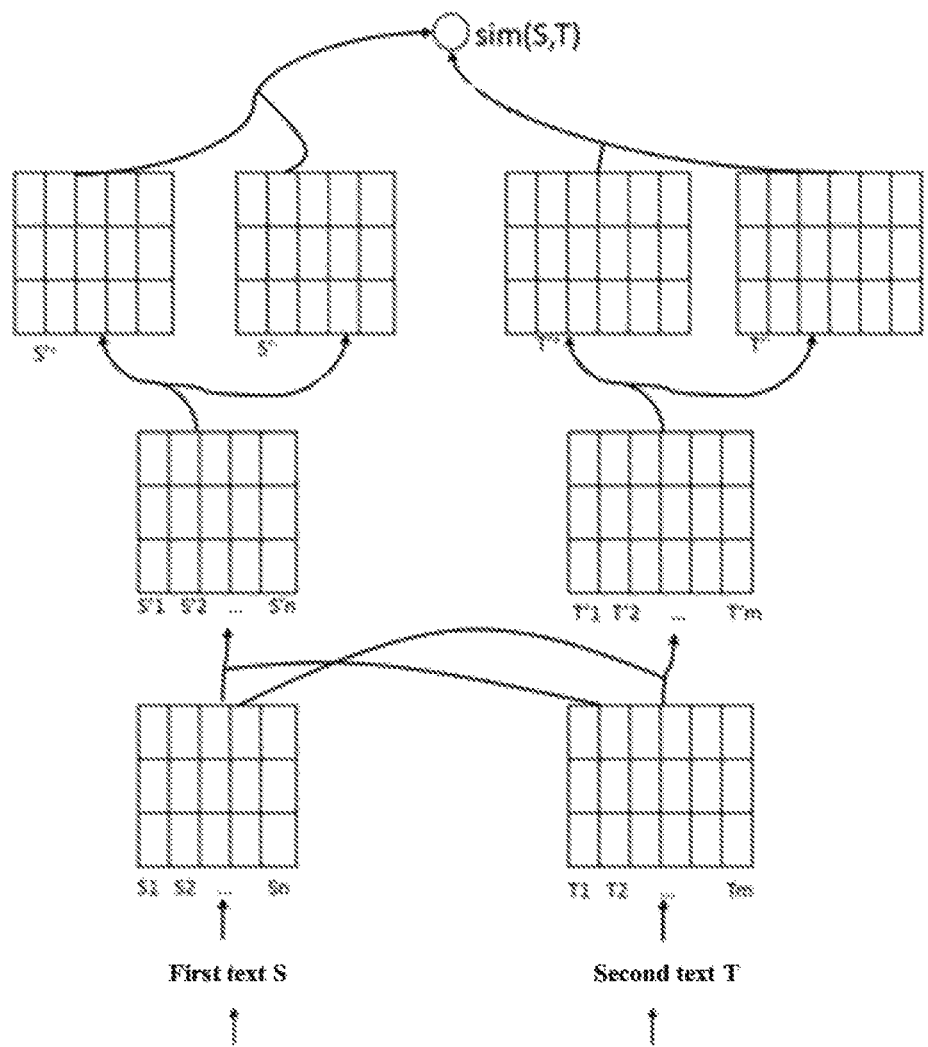
FIG. 1 is a flow chat illustrating a method of calculating relevancy in some embodiments according to the present disclosure.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

In a conventional method of calculating relevancy, typically similarity between texts is considered, but not the dissimilarity between texts. In the present disclosure, it is discovered for the first time that dissimilarity between texts also provides important semantic information that facilitates accurate information matching in the process of calculating relevancy. By also considering dissimilarity between texts, a better and more accuracy result can be obtained in calculating relevancy, rendering information that is more useful in response to a user query.

Accordingly, the present disclosure provides, inter alia, a method of calculating relevancy, an apparatus for calculating relevancy, a data query apparatus, an electronic apparatus that substantially obviate one or more of the problems due to limitations and disadvantages of the related art. In one aspect, the present disclosure provides a method of calculating relevancy. In some embodiments, the method includes respectively mapping the first text and the second text to vectors; determining a similar part and a dissimilar part between the first text and the second text based on the vectors; and calculating the relevancy between the first text and the second text using both the similar part and the dissimilar part. In one example, the method includes mapping the first text into a first set of vectors, and snapping the second text into a second set of vectors. Optionally, the step of determining the similar part and the dissimilar part includes determining a similar part and a dissimilar part of the first text; and determining a similar part and a dissimilar part of the second text.

As used herein, the term "similar part" refers to a part of a text having a similarity measure higher than or equal to a threshold value, and the term "dissimilar part" refers to a part of a text having a similarity measure lower than the threshold value. Optionally, a similar part of a first text refers to a part (e.g., a word, a sentence, a document) of a first text having an identical occurrence in the second text or having a sematic overlay between the first text and the second text, and a similar part of a second text refers to a part (e.g., a word, a sentence, a document) of a second text having an identical occurrence in the first text or having a sematic overlay between the first text and the second text. Optionally, a dissimilar part of a first text refers to a part (e.g., a word, a sentence, a document) of a first text that does not have an identical occurrence in the second text and does not have a sematic overlay between the first text and the second text, and a dissimilar part of a second text refers to a part (e.g., a word, a sentence, a document) of a second text that does not have an identical occurrence in the first text and does not have a sematic overlay between the first text and the second text.

As used herein, the term "relevancy" refers to a measure of a degree of relevancy between two texts, e.g., how pertinent, connected, or applicable a text is to another text (e.g., a query text). Optionally, values of relevancy may be expressed in granularity, and may not have a continuous relationship (e.g., having a 0, 0.5, or 1 relationship). Optionally, the relevancy is calculated by a relevancy algorithm. Optionally, the relevancy algorithm may be trained using a sample data to calculate relevancy scores. Optionally, the relevancy is determined based on a plurality of criteria, e.g., considering both the similar part and the dissimilar part of the texts.

In one example, a user enters a query: "introduction on cold." Three results are found in the database. Text 1: This article introduces sinusitis. Text 2: This article introduces influenza, not the common cold, Text 3: This article introduces influenza, not the pneumonia. In one example, a function sim(.,.) used to represent the similarities between texts. When the similarities between the query text entered by the user and the three texts found in the database are calculated, it can be relatively easily determined that sim("Query Text", "Text 2")>sim("Query Text", "Text 1") and sim("Query Text", "Text 3")>sim("Query Text", "Text 1"). However, it is relatively more difficult to compare between sim("Query Text". "Text 2") and sim("Query Text", "Text 3"). When the dissimilarities between texts are also considered, however, a comparison between sim("Query Text", "Text 2") and sim("Query Text", "Text 3") can be performed. For example, Text 2 emphasizes more on the difference between the influenza and the common cold, e.g., the unique characteristics of the influenza, which are not commonly shared by the common cold. On the other hand, Text 3 emphasizes the difference between the influenza and the pneumonia. Because the influenza and the pneumonia have much less commonly shared characteristics, Text 3 may contain more information about the common characteristics of cold. Thus, it follows that Text 3 is more relevant to the Query Text as compared to Text 2.

In another example, a user enters a query asking for information on a genus A (having a plurality of species, e.g., species i and species ii). Three results are found in the database. Text 1 contains information on a closely related genus B or a species in a closely related genus B. Text 2 contain information on difference between species i and species Text 3 contain information on difference between species i and a related genus C. In one example, a function sim(.,.) used to represent the similarities between texts. When the similarities between the query text entered by the user and the three texts found in the database are calculated, it can be relatively easily determined that sim("Query Text", "Text 2")>sim("Query Text", "Text 1") and sim("Query Text", "Text 3")>sim("Query Text", "Text 1"). However, it is relatively more difficult to compare between sim("Query Text", "Text 2") and sim("Query Text", "Text 3"). When the dissimilarities between texts are also considered, however, a comparison between sim("Query Text", "Text 2") and sim ("Query Text", "Text 3") can be performed. For example, Text 2 emphasizes more on the difference between species i and species ii, e.g., the unique characteristics of species i, which are not commonly shared by the species ii. On the other hand, Text 3 emphasizes the difference between species i and the related genus C. Because species i and the related genus C have much less commonly shared characteristics, Text 3 may contain more information about the common characteristics of the genus A. Thus, it follows that Text 3 is more relevant to the Query Text as compared to Text 2.

In yet another example, a user enters a query asking for information on a "cancer pain" (having various types such as cancer nerve pain and cancer bone pain). Three results are found in the database. Text 1 contains information on migraine. Text 2 contain information on difference between cancer nerve pain and cancer bone pain. Text 3 contain information on how to tell the difference between cancer bone pain and arthritis pain. In one example, a function sim(.,.) used to represent the similarities between texts. When the similarities between the query text entered by the user and the three texts found in the database are calculated, it can be relatively easily determined that sim("Query Text", "Text 2")>sim("Query Text", "Text 1") and sim("Query Text", "Text 3")>sim("Query Text", "Text 1"). However, it is relatively more difficult to compare between sim("Query Text", "Text 2") and sim("Query Text", "Text 3"). When the dissimilarities between texts are also considered, however, a comparison between sim("Query Text", "Text 2") and sim ("Query Text", "Text 3") can be performed. For example, Text 2 emphasizes more on the difference between cancer nerve pain and cancer bone pain, e.g., the unique characteristics of cancer nerve pain, which are not commonly shared by cancer bone pain. On the other hand, Text 3 emphasizes the difference cancer bone pain and arthritis pain. Because cancer hone pain and arthritis pain are caused by two completely different pathological conditions, Text 3 may contain more information about the common characteristics of cancer pain. Thus, it follows that Text 3 is more relevant to the Query Text as compared to Text 2.

FIG. 1 is a flow chat illustrating a method of calculating relevancy in some embodiments according to the present disclosure. Referring to FIG. 1, a method of calculating relevancy in some embodiments includes at least obtaining a first text S and obtaining a second text T; respectively mapping the first text S and the second text T to vectors; determining a similar part and a dissimilar part between the first text S and the second text T; and calculating the relevancy between the first text S and the second text T using the similar part and the dissimilar part. Optionally, the step of determining the similar part and the dissimilar part includes determining a similar part and a dissimilar part of the first text; and determining a similar part and a dissimilar part of the second text.

In some embodiments, the first text S or the second text T is a sentence including a plurality of words. Optionally, the first text S or the second text T is a paragraph including a plurality of sentences. Optionally, the first text S or the second text T is a document including a plurality of paragraphs. Optionally, the first text S or the second text T includes a huge number of documents.

In some embodiments, the first text S and the second text T is obtained from a single data source. In some embodiments, the first text S and the second text T is obtained from a plurality of data sources. Optionally, the source of the first text S and the second text T includes texts stored in or outputted by the local devices (e.g., a cellphone, a pad, and a computer). Optionally, the source of the first text and the second text includes texts transmitted through internet.

In some embodiments, the first text S and the second text T are respectively mapped to separate vectors. For example, the first text S is mapped to S1, S2, . . . , Sn. The second text T is mapped to T1, T2, . . . , Tm. Therefore, S1-Sn is an array of words forming the first text S. For example, S1-Sn is a vector corresponding to the first text S. In one example, S="symptom of cold", S1="symptom", S2="of", S3="cold". Similarly, T1-Tn is an array of words forming the second text T, T1-Tn is a vector corresponding to the second text T. In one example, T="symptom of influenza", T1="symptom", T2="of", T3="influenza."

Various appropriate methods may be used to vectorize text. Examples of appropriate method for vectorizing text include Vector Space Model (VSM) and distributional word representation. Various appropriate computational models may he used to map a text to a vector by distributional word representation, including Latent Semantic Analysis (LSA), Probabilistic Latent Semantic Analysis (PLSA), and Latent Dirichlet Allocation (LDA).

In some embodiments, subsequent to mapping the first text S or the second text T to vectors, the method further includes performing dimension reduction on the vectors, thereby representing the text using low-dimension dense vectors. Optional, dimension reduction is performed by Principal component analysis (PCA). If a multivariate data set is visualized as a set of coordinates in a high-dimensional data space (one axis per variable), PCA can supply the user with a lower-dimensional picture, a projection of this object when viewed from its most informative viewpoint. This is done by using only the first few principal components so that the dimensionality of the transformed data is reduced. Therefore, PCA can linearly transform multiple variances and obtain a few principal variances. Optionally, dimension reduction is performed using methods such as Word2Vec, Sentence2Vec, and Doc2Vec.

In some embodiments, a word embedding process is used to perform dimension reduction. The word embedding process may be conducted using methods such as Word2Vec. In one example, subsequent to dimension reduction, the vector S1-Sn of the first text S and the vector T1-Tm of the second text T are respectively mapped to two sets of low-dimension vectors. When the number of dimensions is d, each word of a text corresponds to a d×1 column vector. The first text S corresponds to a d×n matrix (i.e. matrix P), and the second text T corresponds to a d×m matrix (i.e. matrix Q).

In some embodiments, the similar part and dissimilar part between the first text and the second text are determined. Optionally, the similar part and dissimilar part are determined using a textual encoding method such as Simhash, Shingling, and Minhash. In one example, Simhash is used to binary encode the first text and the second text, and a Hamming distance between the first text and the second text is determined by performing XOR operation (i.e. execute XOR operation on the simhash result of those two texts). In the result of the XOR operation, if the number of result "1: exceeds three, the two texts are determined to be dissimilar (e.g., the dissimilar part); if the number of result "1" is less than or equal to three, the two texts are determined to be similar (e.g., the similar part).

In some embodiments, the step of determining a similar part and a dissimilar part between the first text S and the second text T includes performing a semantic content analysis based on the first text S and the second text T. Optionally, the semantic content analysis includes performing a sematic matching process between the first text and the second text thereby obtaining a sematic overlay between the first text S and the second text T.

In some embodiments, to calculate the similar part between the first text S and the second text T, it is necessary to blow whether every word in S(T) can be semantically overlaid by the words in T(S). For example, the word "cold" in the Query Text can semantically overlay the word "influenza" in Text 3, but can hardly overlay the word "sinusitis" in Text 1. Therefore, sim("Query Text", "Text 3") sim ("Query Text", "Text 1").

In some embodiments, the step of determining the semantic overlay between the first text S and the second text T includes reconstructing a vector of a word in the first text S (e.g., a word Si) using word vectors of the second text T; and calculating the semantic overlay based on a result of the reconstruction. Optionally, Equation (1) is used to calculate the semantic overlay of the words of the first text S over the second text T:

$$\min\left( \left\| S_i - \sum_{j=1}^{m} \alpha_{i,j} \times T_j \right\|^2 + \lambda \sum_{j=1}^{m} \alpha_{i,j}^2 \right); \quad (1)$$

wherein each of $S_i$ and $T_j$ is a d×1 column vector; each of $S_i$ and $T_j$ is a word vector obtained from the word embedding process; $\alpha_{i,j}$ is parameter. $\lambda > 0$, and $\lambda$ is a positive real number. Optionally, $S_i$ is a d×1 column vector of the first text; $T_j$ is a d×1 column vector of the second text; $\alpha_{i,j}$ is parameter for semantic overlay calculation; $\lambda > 0$; and $\lambda$ is a positive real number.

For example, the parameter $\alpha_{i,j}$ can be solved by the following method:

First, a convex function $f_i$ is provided to satisfy $$f_i = \left\| S_i - \sum_{j=1}^{m} \alpha_{i,j} \times T_j \right\|^2 + \lambda \sum_{j=1}^{m} \alpha_{i,j}^2.$$

To obtain a minimum value for $f_i$, $\alpha_{i,j}$ should meet the condition of $$\frac{\partial f_i}{\partial \alpha_{i,j}} = 0.$$

Accordingly, it can be derived that $$\begin{aligned}\frac{\partial f_i}{\partial \alpha_{i,j}} &= -2\left( S_i - \sum_{k=1}^{m} \alpha_{i,k} T_k \right)^T T_j + 2\lambda \alpha_{i,j} \\ &= -2\left[ S_i^T T_j - \sum_{k=1}^{m} \alpha_{i,k} T_k^T T_j - \lambda \alpha_{i,j} \right] = 0 \\ &=> S_i^T T_j - \sum_{k=1}^{m} \alpha_{i,k} T_k^T T_j - \lambda \alpha_{i,j} = 0;\end{aligned} \quad (2)$$

wherein a superscript T stands for a transpose of an original matrix. Because the above formula is equally applicable when i=1, 2, . . . ,n and when j=1, 2, . . . , m. A total number of n×m equations can be generated to solve values of n×m parameters.

To illustrate the process of solving the values auxin parameters, the equation $$S_i^T T_j - \sum_{k=1}^{m} \alpha_{i,k} T_k^T T_j - \lambda \alpha_{i,j} = 0$$

can be better represented in matrix format. First, an n×m matrix R is provided, with an element $R_{i,j}$ in i-th row and j-th column to be $R_{i,j} = S_i^T T_j$. The matrix R can be represented as $R = P^T Q$, wherein P and Q are corresponding to matrixes formed after word embedding. Second, a m×m matrix U is provided, with an element $U_{k,j}$ k-th row and j-th column to be $U_{k,j} = T_k^T T_j$. The matrix U can be represented as $U = Q^T Q$, wherein Q corresponds to a matrix formed after word embedding. Third, an n×m matrix A is provided, with an element in i-th row and j-th column to be $\alpha_{i,j}$. Fourth, using the matrices R, U, and A, the equation $$S_i^T T_j - \sum_{i=1}^{m} \alpha_{i,k} T_k^T T_j - \lambda \alpha_{i,j} = 0$$

can be represented as $$\begin{aligned}R - AU - \lambda A &= 0 \\ => R &= AU + \lambda A \\ &= A(U + \lambda I) \\ => A &= R(U + \lambda I)^{-1}\end{aligned}$$

(3); wherein, I is m×m unit matrix.

During the process of solving equation (2), the matrix (U+λI) should be a non-singular matrix, i.e. an inverse matrix of the matrix (U+λI) exists. Because $U_{k,j} = T_k^T T_j$, U is a m×m real symmetric matrix. A diagonal matrix Λ similar to the matrix U exists, i.e. $V^{-1}UV = \Lambda$. Accordingly, it can be derived that $V^{-1}(U+\lambda I)V = \Lambda + \lambda I$. As long as λ is not equal to the negative eigenvalue of the matrix U, the eigenvalue of the matrix (U+λI) (i.e., the elements along the diagonal of Λ+λI) will not be zero, and the matrix (U+λI) is a non-singular matrix. The eigenvalue of matrix U can be any real number in real number field. Provided that the distribution function of matrix U is F(x), and because the value of x is continuous, for any provided real number a, a's probability value F(a)=0. Therefore, without a priori knowledge, the probability of pre-determining the value of λ to be equal to the negative eigenvalue of the matrix U is substantially zero, i.e., an inverse matrix of the matrix (U+λI) exists.

Similarly, using the same method, a semantic overlay of the words of the second text T over the first text S can also be obtained. Optionally, Equation (3) is used to calculate the semantic overlay of the words of the second text T over the first text S:

$$\min(\|T_i - \Sigma_{j=1}^{m} \beta_{i,j} \times S_j\|^2 + \lambda \Sigma_{j=1}^{m} \beta_{i,j}^2) \quad (3);$$

Wherein each of $T_i$ and $S_j$ is a d×1 column vector, each of $T_i$ and $S_j$ is a word vector Obtained from the word embedding process; $\beta_{i,j}$ is parameter. $\lambda > 0$, and $\lambda$ is a positive real number. Optionally, $T_i$ is a d×1 column vector of the first text; $S_j$ is a d×1 column vector of the second text; $\beta_{i,j}$ is parameter for semantic overlay calculation; $\lambda > 0$; and $\lambda$ is a positive real number.

Various alternative methods may be used for solve the Equation (1) and the Equation (3) above. Examples of appropriate methods include numerical methods and algebraic methods.

In some embodiments, the semantics decomposition can be used to obtain the similar part and the dissimilar part between the first text S and the second text T (e.g., the similar part and dissimilar part of the first text S when comparing the first text S to the second text T, and the similar part and dissimilar part of the second text T when comparing the second text T to the first text S.

In some embodiments, the matrix A (see equation (2)) is based on how every word in the first text S is represented or overlaid in the second text T, wherein the i-th row of the matrix A shows how word $S_i$ is represented or overlaid in text. T. Provided that $$S'_i = \sum_{j=1}^{m} A_{i,j} \times T_j, S'_i$$

represents the similar part of the first text S, e.g., a part of word $S_i$ of the first text S that can be overlaid by the second text T. Then, $S_i$-$S'_i$ represents the dissimilar part of the first text S. The first text S is represented by two parts, similar part (represented by a d×n matrix, refer to the similar part $S'^+$ in FIG. 1) and dissimilar part (represented by a d×n matrix, refer to the dissimilar part $S'^-$ in FIG. 2). Thus, the text can be represented by a d×2n matrix instead of a d×n matrix. By adopting this method, the similar part and dissimilar part of the first text S when comparing the first text S and the second text T can be calculated.

Similarly, calculating the similar part and dissimilar part between the second text T and the first text S includes adopting the equation $$T'_j = \sum_{j=1}^{m} A_{i,j} \times S_j,$$

wherein $A_{i,j}$ is the matrix of $\beta_{i,j}$, $T'_j$ represents the similar part of the second text T, and $T_j$-$T'_j$ represents the dissimilar part of the second text T. The second text T includes two parts, a similar part (represented by a d×m matrix, refer to the similar part $T'^+$ in FIG. 1) and a dissimilar part (represented by a d×m matrix, refer to the dissimilar part $T'^-$ in FIG. 2). By adopting this method, the similarity and dissimilarity of the second text T when comparing the first text S and the second text T can also be calculated.

In some embodiments, based on a determination of the similar part and the dissimilar part of each of the first text S and the second text T, the relevancy between the first text S and the second text T can be calculated. Optionally, calculating the relevancy includes determining a Jaccard similarity through textual encoding. Optionally, calculating the relevancy is performed by textual semantics calculation. Optionally, calculating the relevancy is performed by machine learning.

In some embodiments, the relevancy between the first text and the second text can be calculated using a Recurrent Neural Network (RNN). Optionally, using RNN includes using sample data to train RNN. In one example, the sample data is represented as (Ss, Ts, L), wherein Ss and Ts represent sample texts (e.g., Ss represent a first sample text, and Ts represent a second sample text), and L represents relevancy. Optionally, Ss and Ts are the originally inputted first text S and second text T. Optionally, Ss and Ts are sample texts different from the first text S and the second text T. Optionally, the granularity of the relevancy can be assigned. In one example, the granularity is 2, L∈{0,1}, wherein 0 represents irrelevant, and 1 represents relevant, in another example, the granularity is 3, L∈{0, 0.5, 1}, wherein 0 represents irrelevant, 0.5 represents somewhat relevant, 1 represents very relevant.

Optionally, in order to train the RNN with the sample data, the sample data is inputted in the RNN. A composite relevancy based on the similar part of the first text S, the similar part of the second text T, the dissimilar part of the first text S, and the dissimilar part of the second text T is then calculated. In one example, when the granularity is set to 2, a composite relevancy in a first range is defined to have a granularity of 1, and a composite relevancy in a second range different from the first range is defined to have a granularity of 0. In another example, when the granularity is set to 3, a composite relevancy in a first range is defined to have a granularity of 1, a composite relevancy in a second range is defined to have a granularity of 0.5, and a composite relevancy in a third range is defined to have a granularity of 0, the first range, the second range, and the third range being different from each other. Once the RNN is trained using the sample data, it can be used for calculating the relevancy on non-sample data. In a trained RNN, by inputting a d×2n matrix which represents the first text S and a d×2m matrix which represents the second text T (e.g., inputting the similar part and dissimilar part of the first text S and the second text T), the RNN can be used to calculate the relevancy based on input information.

In the present method of calculating the relevancy, the effects of both the similar part and the dissimilar part between two texts are considered. Consequently, the present method enables a relevancy calculation with a finer granularity classification, thereby enhancing the accuracy of textual matching, and rendering highly accurate search or query results.

Figure 2:
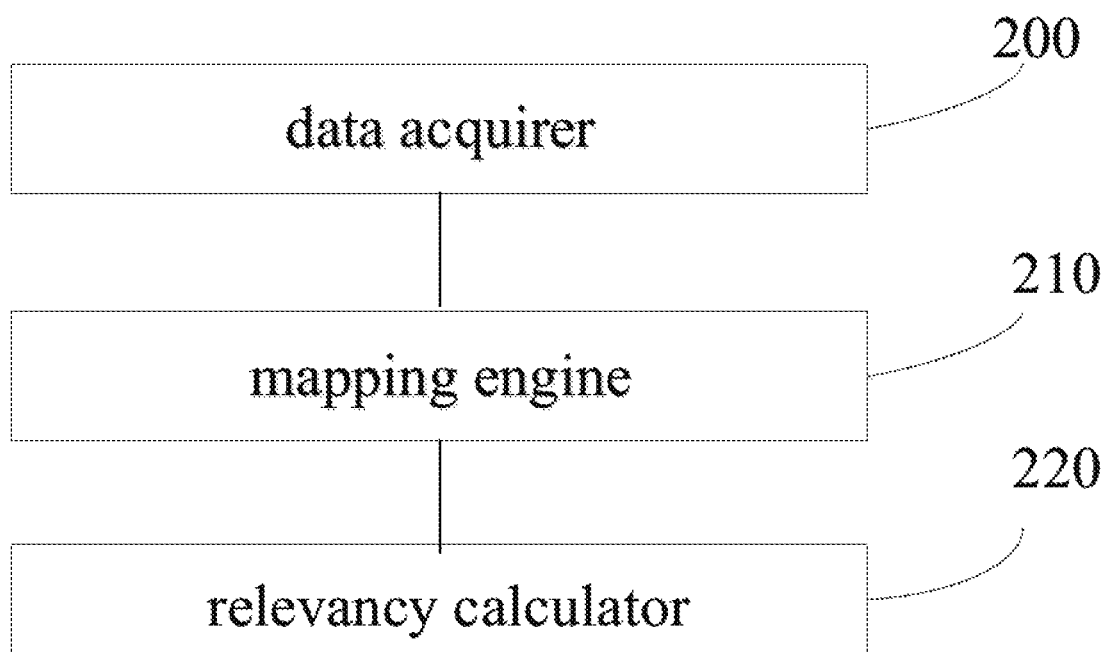
FIG. 2 is a schematic diagram illustrating the structure of an apparatus for calculating relevancy in some embodiments according to the present disclosure.
Figure 3:
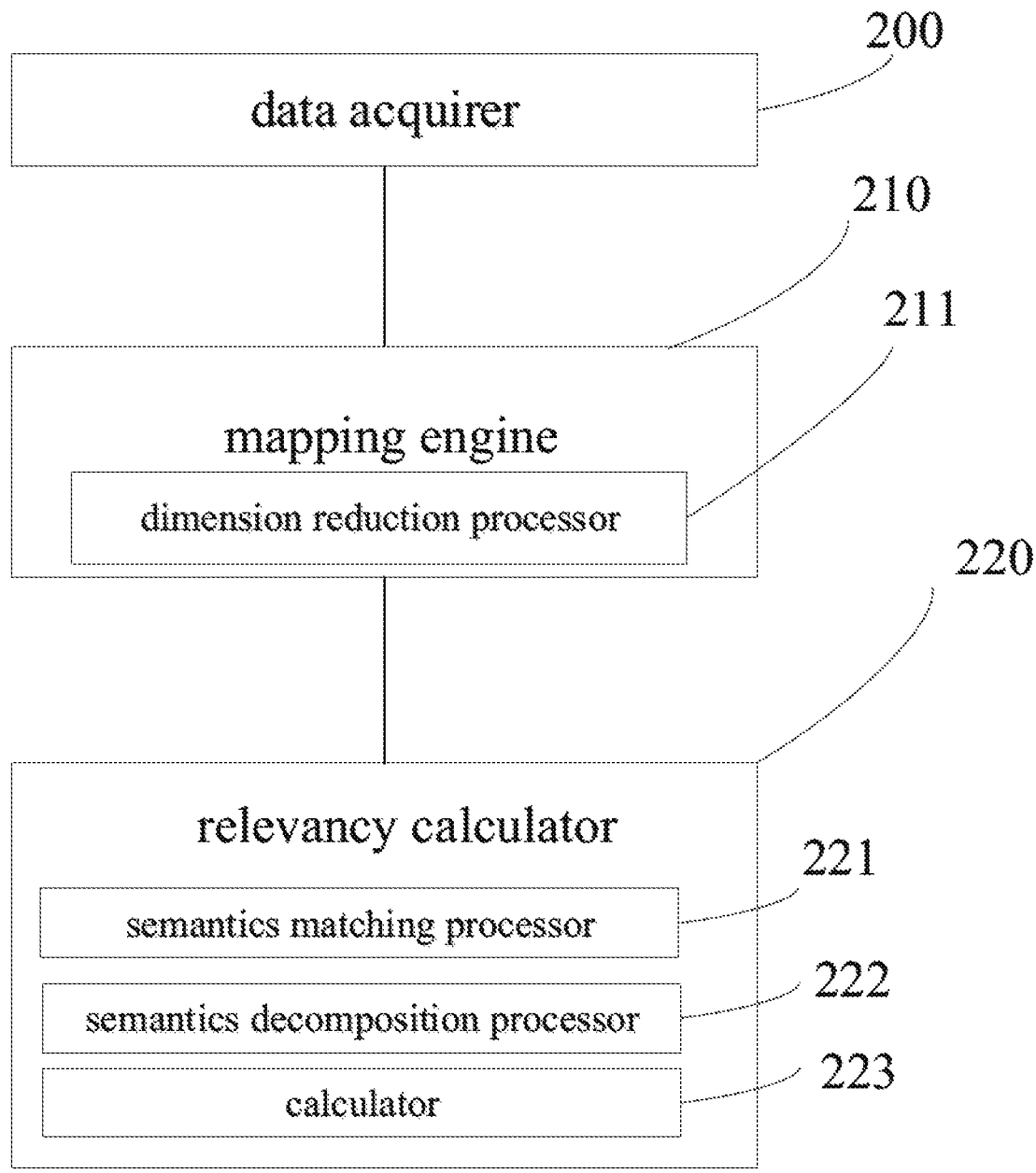
FIG. 3 is a schematic diagram illustrating the structure of an apparatus for calculating relevancy in some embodiments according to the present disclosure.

In another aspect, the present disclosure also provides an apparatus for calculating relevancy. FIG. 2 and FIG. 3 are schematic diagrams illustrating the structure of an apparatus for calculating relevancy in some embodiments according to the present disclosure. Referring to FIG. 2 the apparatus for calculating relevancy has a data acquirer 200 configured to obtain a first text and a second text; a mapping engine 210 configured to respectively map the first text and the second text to vectors; an relevancy calculator 220 configured to determine a similar part and a dissimilar part between the first text and the second text based on the vectors, and calculate the relevancy between the first text and the second text based on the similar part and the dissimilar part. Optionally, the relevancy calculator 220 configured to determine a similar part and a dissimilar part of the first text, and determining a similar part and a dissimilar part of the second text.

In some embodiments, referring to FIG. 3, the mapping engine 210 includes a dimension reduction processor 211 configured to reduce the dimension of vectors respectively corresponding to the first text and the second text.

In some embodiments, referring to FIG. 3, the relevancy calculator 220 includes a semantics matching processor 221 configured to perform semantic matching between the first text and the second text; a semantics decomposition processor 222 configured to determine the similar part and the dissimilar part between the first text and the second text; a calculator 223 configured to calculate the relevancy between the first text and the second text basing on the similar part and the dissimilar part. Optionally, the semantics decomposition processor 222 configured to determine a similar part and a dissimilar part of the first text, and determining a similar part and a dissimilar part of the second text.

Optionally, the semantics matching processor 221 is configured to determine semantic overlay between the first text and the second text by reconstructing the first text's vector using the second text's vector, e.g., by reconstructing a vector of a word in the first text using word vectors of the second text.

In some embodiments, the semantics matching processor 221 is configured to use Equation (1), $$\min\left(\left\|S_i - \sum_{j=1}^{m} \alpha_{i,j} \times T_j\right\|^2 + \lambda \sum_{j=1}^{m} \alpha_{i,j}^2\right),$$

to calculate the semantic overlay of the words of the first text S over the second text T, wherein, $S_i$ is a column vector (e.g., a d×1 column vector) of the first text; $T_j$ is the column vector (e.g., a d×1 column vector) of the second text; $\alpha_{i,j}$ is a parameter for semantic overly; $\lambda > 0$, and $\lambda$ is a positive real number. Optionally, $S_i$ is a d×1 column vector of the first text; $T_j$ is a d×1 column vector of the second text; $\alpha_{i,j}$ is parameter for semantic overlay calculation; $\lambda > 0$; and $\lambda$ is a positive real number.

In some embodiments, the semantics matching processor 221 is configured to use Equation (3), $$\min(\|T_i - \Sigma_{j=1}^{m}\beta_{i,j} \times S_j\|^2 + \lambda \Sigma_{j=1}^{m}\beta_{i,j}^2),$$

to calculate the semantic overlay of the words of the second text T over the first text S, wherein, $T_i$ is a column vector (e.g., a d×1 column vector) of the second text; $S_j$ is the column vector (e.g., a d×1 column vector) of the first text; $\beta_{i,j}$ is a parameter for semantic overly; $\lambda > 0$, and $\lambda$ is a positive real number. Optionally, $T_i$ is a d×1 column vector of the first text; $S_j$ is a d×1 column vector of the second text; $\beta_{i,j}$ is parameter for semantic overlay calculation; $\lambda > 0$; and $\lambda$ is a positive real number.

Optionally, the semantics decomposition processor 222 is configured to obtain the similar part and the dissimilar part of the first text based on the equation of $$S'_i = \sum_{j=1}^{m} A_{i,j} \times T_j,$$

wherein $A_{i,j}$ is the matrix of $\alpha_{i,j}$; $S'_i$ stands for the similar part of the first text; and $S_i - S'_i$ stands for the dissimilar part of the second text.

Optionally, the semantics decomposition processor 222 is configured to obtain the similar part and the dissimilar part of the second text based on the equation of $$T'_j = \sum_{j=1}^{m} A_{i,j} \times S_j,$$

wherein $A_{i,j}$ is the matrix of $\beta_{i,j}$; $T'_j$ stands for the similar part of the first text; and $T_j - T'_j$ stands for the dissimilar part of the second text.

In some embodiments, the apparatus for calculating relevancy includes a memory; and one or more processor. The memory and the at least one processor are connected with each other. The memory stores computer-executable instructions for controlling the one or more processors to respectively map the first text and the second text to vectors; determine a similar part and a dissimilar part between the first text and the second text based on the vectors; and calculate the relevancy between the first text and the second text using both the similar part and the dissimilar part. Optionally, the memory further stores computer-executable instructions for controlling the one or more processors to, subsequent to respectively mapping the first text and the second text to vectors, perform dimension reduction on the vectors, thereby representing the text using low-dimension dense vectors. Optionally, dimension reduction is performed using one or more methods selected from a group consisting of Word2Vec, Sentence2Vec, and Doc2Vec. Optionally, the memory stores computer-executable instructions for controlling the one or more processors to determine a similar part and a dissimilar part of the first text; and determine a similar part and a dissimilar part of the second text.

In some embodiments, the memory further stores computer-executable instructions for controlling the one or more processors to perform a semantic content analysis based on the first text and the second text thereby determining the similar part and dissimilar part. Optionally, the memory further stores computer-executable instructions for controlling the one or more processors to perform a sematic matching process between the first text and the second text thereby obtaining a sematic overlay between the first text and the second text. Optionally, the memory further stores computer-executable instructions for controlling the one or more processors to reconstruct a vector of a word in the first text S using word vectors of the second text, and calculate the semantic overlay based on a result of reconstruction. Optionally, the semantic overlay of the words of the first text S over the second text T is calculated based on Equation (1):

$$\min\left(\left\|S_i - \sum_{j=1}^{m} \alpha_{i,j} \times T_j\right\|^2 + \lambda \sum_{j=1}^{m} \alpha_{i,j}^2\right); \quad (1)$$

wherein $S_i$ is a d×1 column vector of the first text; $T_j$ is a d×1 column vector of the second text; $\alpha_{i,j}$ is parameter for semantic overlay calculation; $\lambda > 0$; and $\lambda$ is a positive real number. Optionally, $S_i$ is a d×1 column vector of the first text; $T_j$ is a d×1 column vector of the second text; $\alpha_{i,j}$ is parameter for semantic overlay calculation; $\lambda > 0$; and $\lambda$ is a positive real number.

Optionally, the semantic overlay of the words of the second text T over the first text S is calculated based on Equation (3), $$\min(\|T_i - \Sigma_{j=1}^{m}\beta_{i,j} \times S_j\|^2 + \lambda \Sigma_{j=1}^{m}\beta_{i,j}^2) \quad (3);$$

wherein, $T_i$ is a column vector (e.g., a d×1 column vector) of the second text; $S_j$ is the column vector (e.g., a d×1 column vector) of the first text; $\beta_{i,j}$ is a parameter for semantic overly; $\lambda > 0$, and $\lambda$ is a positive real number. Optionally, $T_i$ is a d×1 column vector of the first text; $S_j$ is a d×1 column vector of the second text; $\beta_{i,j}$ is parameter for semantic overlay calculation; $\lambda > 0$; and $\lambda$ is a positive real number.

Optionally, the similar part of the first text is calculated based on $$S'_i = \sum_{j=1}^{m} A_{i,j} \times T_j;$$

S'$_i$ represents the similar part of the first text, and A$_{i,j}$ is a matrix of α$_{i,j}$. Optionally, S$_i$-S'$_i$ represents the dissimilar part of the first text.

Optionally, the similar part of the second text is calculated based on $$T'_j = \sum_{j=1}^{m} A_{i,j} \times S_j; T'_j$$

represents the similar part of the second text, and A$_{i,j}$ is a matrix of β$_{i,j}$. Optionally, T$_j$-T'$_j$ represents the dissimilar part of the second text.

In some embodiments, the memory further stores computer-executable instructions for controlling the one or more processors to perform a semantics decomposition on the first text and the second text thereby determining the similar part and dissimilar part.

In some embodiments, the apparatus further includes a Recurrent Neural Network using the similar part and the dissimilar part of the first text and the second text as input to calculate the relevancy between the first text and the second text. Optionally, the memory further stores computer-executable instructions for controlling the one or more processors to train the Recurrent Neural Network using a sample data represented as (Ss, Ts, L), wherein Ss stands for a first sample text, Ts stands for a second sample text, and. L represents a sample relevancy. Optionally, Ss and Ts are the originally inputted first text S and second text T. Optionally, Ss and Ts are sample texts different from the first text S and the second text T. Optionally, the memory further stores computer-executable instructions for controlling the one or more processors to assign a first value of granularity to a first relevancy in a first range and a second value of granularity to a second relevancy in a second range.

In another aspect, the present disclosure also provides a non-transitory computer-readable storage medium storing computer-readable instructions. In some embodiments, the computer-readable instructions are executable by a processor to cause the processor to perform one or more steps of the method described herein. In some embodiments, the computer-readable instructions are executable by a processor to cause the processor to respectively map the first text and the second text to vectors; determine a similar part and a dissimilar part between the first text and the second text based on the vectors; and calculate the relevancy between the first text and the second text using both the similar part and the dissimilar part. Optionally, the computer-readable instructions are executable by a processor to further cause the processor to, subsequent to respectively mapping the first text and the second text to vectors, perform dimension reduction on the vectors, thereby representing the text using low-dimension dense vectors. Optionally, dimension reduction is performed using one or more methods selected from a group consisting of Word2Vec, Sentence2Vec, and Doc2Vec. Optionally, the computer-readable instructions are executable by a processor to cause the processor to determine a similar part and a dissimilar part of the first text; and determine a similar part and a dissimilar part of the second text.

In some embodiments, the computer-readable instructions are executable by a processor to cause the processor to perform a semantic content analysis based on the first text and the second text thereby determining the similar part and dissimilar part. Optionally, the computer-readable instructions are executable by a processor to cause the processor to perform a sematic matching process between the first text and the second text thereby obtaining a sematic overlay between the first text and the second text. Optionally, the computer-readable instructions are executable by a processor to cause the processor to reconstruct a vector of a word in the first text S using word vectors of the second text, and calculate the semantic overlay based on a result of reconstruction. Optionally, the semantic overlay of the words of the first text S over the second text T is calculated based on Equation (1):

$$\min\left(\left\|S_i - \sum_{j=1}^{m} \alpha_{i,j} \times T_j\right\|^2 + \lambda \sum_{j=1}^{m} \alpha_{i,j}^2\right); \quad (1)$$

wherein S$_i$ is a d×1 column vector of the first text; is a d×1 column vector of the second text; α$_{i,j}$ is parameter for semantic overlay calculation; λ>0; and λ is a positive real number. Optionally, S$_i$ is, a d×1 column vector of the first text; T$_j$ is a d×1 column vector of the second text; α$_{i,j}$ is parameter for semantic overlay calculation; λ>0; and λ is a positive real number.

Optionally, the semantic overlay of the words of he second text T over the first text S is calculated based on Equation (3):

$$\min(\|T_i - \Sigma_{j=1}^{m} \beta_{i,j} \times S_j\|^2 + \lambda \Sigma_{j=1}^{m} \beta_{i,j}^2) \quad (3);$$

wherein, T$_i$ is a column vector (e.g., a d×1 column vector) of the second text; S$_j$ is the column vector (e.g., a d×1 column vector) of the first text; β$_{i,j}$ is a parameter for semantic overly; λ>0, and λ is a positive real number. Optionally, T$_i$ is a d×1 column vector of the first text; S$_j$ is a d×1 column vector of the second text; β$_{i,j}$ is parameter for semantic overlay calculation; λ>0; and λ is a positive real number.

Optionally, the similar part of the first text is calculated based on $$S'_i = \sum_{j=1}^{m} A_{i,j} \times T_j;$$

S'$_i$ represents the similar part of the first text, and A$_{i,j}$ is a matrix of α$_{i,j}$. Optionally, S$_i$-S'$_i$ represents the dissimilar part of the first text.

Optionally, the similar part of the second text is calculated based on $$T'_j = \sum_{j=1}^{m} A_{i,j} \times S_j; T'_j$$

represents the similar part of the second text, and A$_{i,j}$ is a matrix of β$_{i,j}$. Optionally, represents the dissimilar part of the second text.

In some embodiments, the computer-readable instructions are executable by a processor to cause the processor to perform a semantics decomposition on the first text and the second text thereby determining the similar part and dissimilar part.

Figure 4:
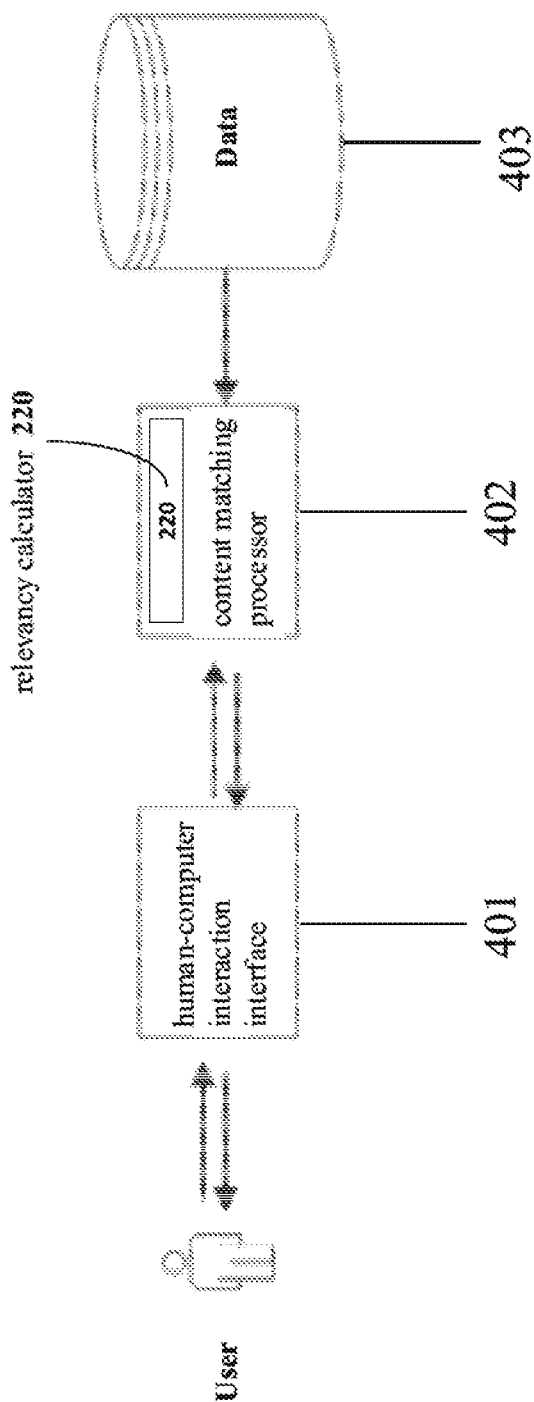
FIG. 4 is a schematic diagram illustrating the structure of a data query apparatus in some embodiments according to the present disclosure.

In another aspect, the present disclosure also provides a data query apparatus. In some embodiments, the data query apparatus includes the apparatus for calculating relevancy as described herein. FIG. 4 is a schematic diagram illustrating the structure of a data query apparatus in some embodiments according to the present disclosure. Referring to FIG. 4, the data query apparatus in some embodiments includes a human-computer interaction interface 401. Optionally, the human-computer interaction interface 401 is a medical question answering platform, which can receive patients' questions and display the corresponding answers. Optionally, the human-computer interaction interface 401 is a medical literature searching system, which can receive the content the user is looking for and display the corresponding literature.

In some embodiments, the data query apparatus further includes a content matching processor 402 and a database 403. Optionally, the content matching processor 402 includes the relevancy calculator 220 described herein.

In some embodiments, when the user enters the content he wants to search on the human-computer interaction interface 401, the content matching processor 402 collects the potential target contents from the database 403. Optionally, the content matching processor 402 adopts the relevancy calculating methods described herein to calculate the relevancy between the potential target contents and the content entered by the user. Optionally, the content matching processor 402 selects the content the user looks for from the potential target contents based on a ranking of relevancy.

In another aspect, the present disclosure also provides a data query method. In some embodiments, the data query method includes calculating relevancy between a first text and a second text according to the method of calculating relevancy described herein. The second text is a text selected from a plurality of potential target texts. Optionally, the data query method further includes ranking the plurality of potential target texts based on calculation of relevancy between the plurality of potential target texts and the first text; and selecting a target text out of the plurality of potential target texts based on a resulting of ranking the plurality of potential target texts. Optionally, the method further includes outputting the target text as a result of data query to a user.

Figure 5:
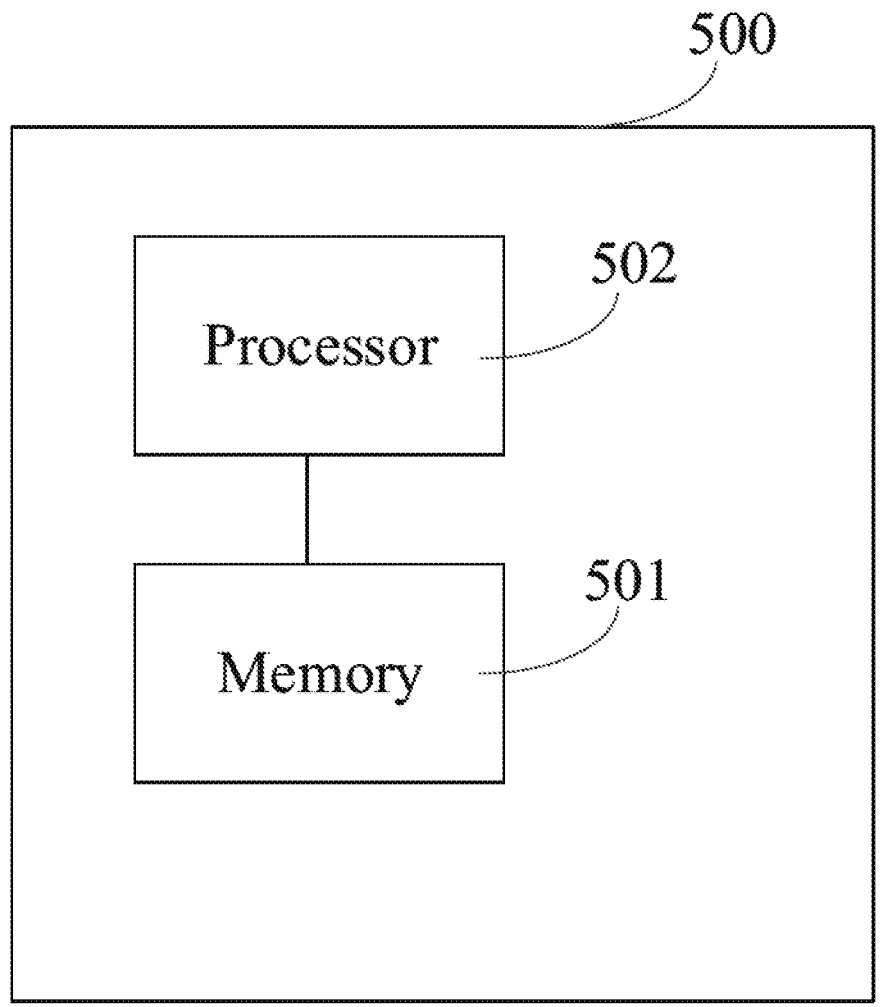
FIG. 5 is a schematic diagram illustrating an electronic apparatus in some embodiments according to the present disclosure.

In another aspect, the present disclosure further provides an electronic apparatus 500. FIG. 5 is a schematic diagram illustrating the electronic apparatus in some embodiments according to the present disclosure. Optionally, the electronic apparatus 500 includes a processor 502. Optionally, the processor 502 is configured to run computer instructions to perform at least one step of the relevancy calculation described herein.

Optionally, the electronic apparatus 500 includes at least a memory 501 connected to at least one the processor 502. Optionally, the memory 501 is configured to store computer instructions.

In some embodiment, the electronic apparatus 500 is a local end apparatus, which means the electronic apparatus 500 can calculate the relevancy on the user end. In some embodiments, the electronic apparatus 500 is a local and remote interaction apparatus, i.e. the electronic apparatus 500 obtains at least a first text and a second text at the user end apparatus (i.e. local end), and the remote internet processor (i.e. remote end) receives the first text and the second text and perform the similarity calculation.

In some embodiments, the electronic apparatus 500 can include a plurality of user end apparatus and a plurality of remote internet processor connecting to the user end apparatus. Optionally, the plurality of the user end apparatus upload information containing at least a first text and a second text to the remote Internet processor. Optionally, the information uploaded is the query text entered or stored by the user. Optionally, the remote internet processor collects the information uploaded by every user end apparatus. Optionally, the remote internet processor then performs the relevancy calculation.

In some embodiments, the memory 501 can be formed by any type of volatile storage devices or non-volatile storage devices or the combination of both the volatile and non-volatile storage devices. The types of volatile storage devices or non-volatile storage devices include Static Random-Access Memory (SRAM), Electrically Erasable Programmable Read-only Memory (EEPROM), Erasable Programmable Read-only Memory (EPROM), Programmable Read-only Memory (PROM), Read-only Memory (ROM), magnetic memory, flash memory, disk or CD.

In some embodiments, the processor 502 is a logical operation apparatus having data processing capabilities and/or program execution capabilities, such as Central Processing Unit (CPU), Field-Programmable Gate Allay (FPGA), Microcontroller Unit (MCU), Digital Signal Processor (DSP), Application-Specific Integrated Circuit (ASIC), graphics processing unit (GPU). Optionally, one or a plurality of the processor can be configured to execute the relevancy calculation concurrently with a parallel processor. Optionally, one or a plurality of the processor can be configured to execute part of the relevancy calculation. Optionally, other processors can be configured to execute the remaining part of the relevancy calculation.

In some embodiments, the computer instructions include at least one processor's operation defined by the instruction set corresponding to the processor. Optionally, the computer instruction can be logically contained and represented by at least one computer programs.

In some embodiments, the electronic apparatus 500 can be connected to input apparatus such as a user interface, a keyboard. Optionally, the electronic apparatus 500 can be connected to output apparatus such as a speaker. Optionally, the electronic apparatus can be connected to the apparatus performing the interaction between user and the electronic apparatus 500, such as a display device.

In some embodiments, the electronic apparatus 500 can be connected to various input apparatus, output apparatus or other interaction apparatus through networks including wireless network, wired network, and/or any combination of wireless and wired network. Optionally, the network includes a local area network, the internet, a telecommunication network, an internet of thins based on the Internet and/or a telecommunications network, and any combination of the above-mentioned network. Optionally, the wired network can use different materials to communicate, including twisted pair, coaxial able, and fiber. Optionally, the wireless network can also use different materials to communicate, including a 3G/4G/5G mobile communication network, Bluetooth, Zigbee, and Wi-Fi.

The present disclosure also provides a computer readable storage medium, which is configured to store computer instructions. When the computer instructions are executed, at least one of the step of the relevancy calculation is performed.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not. imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A method of calculating relevancy between a first text and a second text, comprising:
   respectively mapping the first text and the second text to vectors;
   determining a similar part and a dissimilar part between the first text and the second text based on the vectors; and
   calculating the relevancy between the first text and the second text using both the similar part and the dissimilar part;
   wherein determining the similar part and dissimilar part comprises performing a semantic content analysis based on the first text and the second text;
   wherein the semantic content analysis comprises performing a semantic matching process between the first text and the second text thereby obtaining a semantic overlay between the first text and the second text;
   wherein performing the semantic matching process comprises:
   reconstructing a vector of a word in the first text using word vectors of the second text; and
   calculating the semantic overlay based on a result of the reconstructing;
   wherein the semantic overlay is calculated based on Equation (1):

$$\min(\|S_i - \Sigma_{j=1}^m \alpha_{i,j} \times T_j\|^2 + \lambda \Sigma_{j=1}^m \alpha_{i,j}^2) \quad (1);$$

wherein $S_i$ is a d×1 column vector of the first text $T_j$ is a d×1 column vector of the second text $\alpha_{i,j}$ is parameter for semantic overlay calculation; $\lambda > 0$; and $\lambda$ is a positive real number.

2. The method of claim 1, wherein determining the similar part and the dissimilar part comprises:
   determining a similar part and a dissimilar part of the first text; and
   determining a similar part and a dissimilar part of the second text.

3. The method of claim 1, subsequent to respectively mapping the first text and the second text to vectors, further comprising performing dimension reduction on the vectors, thereby representing the first text and the second text respectively using low-dimension dense vectors.

4. The method of claim 1, wherein determining the similar part and dissimilar part comprises performing a semantics decomposition on the first text and the second text.

5. The method of claim 1, wherein the similar part of the first text is calculated based on $$S'_i = \sum_{j=1}^m A_{i,j} \times T_j;$$

wherein $S'_i$ represents the similar part of the first text, and $A_{i,j}$ is a matrix of $\alpha_{i,j}$; and
$S_i - S'_i$ represents the dissimilar part of the first text.

6. The method of claim 1, wherein the semantic overlay is calculated based on Equation (2):

$$\min(\|T_i - \Sigma_{j=1}^m \beta_{i,j} \times S_j\|^2 + \lambda \Sigma_{j=1}^m \beta_{i,j}^2) \quad (2);$$

wherein $T_i$ is a d×1 column vector of the second text; $S_j$ is a d×1 column vector of the first text; $\beta_{i,j}$ is parameter for semantic overlay calculation; $\lambda > 0$; and $\lambda$ is a positive real number.

7. The method of claim 6, wherein the similar part of the second text is calculated based on $$T'_j = \sum_{j=1}^m A_{i,j} \times S_j;$$

wherein $T'_j$ represents the similar part of the second text, and $A_{i,j}$ is a matrix of $\beta_{i,j}$; and
$T_j - T'_j$ represents the dissimilar part of the second text.

8. The method of claim 1, wherein the relevancy between the first text and the second text is calculated using a Recurrent Neural Network using the similar part and the dissimilar part between the first text and the second text as input.

9. The method of claim 8, further comprising training the Recurrent Neural Network using a sample data represented as (Ss, Ts, L), wherein Ss stands for a first sample text, Ts stands for a second sample text, and L represents a sample relevancy.

10. An apparatus for calculating relevancy between a first text and a second text, comprising:
    a memory; and
    one or more processors;
    wherein the memory and the one or more processors are connected with each other;
    the memory stores computer-executable instructions for controlling the one or more processors to:
    respectively map the first text and the second text to vectors;
    determine a similar part and a dissimilar part between the first text and the second text based on the vectors; and
    calculate the relevancy between the first text and the second text using both the similar part and the dissimilar part;
    wherein the memory stores computer-executable instructions for controlling the one or more processors to perform a semantic content analysis based on the first text and the second text thereby determining the similar part and dissimilar part;

wherein the memory stores computer-executable instructions for controlling the one or more processors to perform a semantic matching process between the first text and the second text thereby obtaining a semantic overlay between the first text and the second text;

wherein the memory stores computer-executable instructions for controlling the one or more processors to:

reconstruct a vector of a word in the first text using word vectors of the second text; and calculate the semantic overlay based on a result of the reconstructing;

wherein the semantic overlay is calculated based on Equation (1):

$$\min(\|S_i - \Sigma_{j=1}^m \alpha_{i,j} \times T_j\|^2 + \lambda \Sigma_{j=1}^m \alpha{i,j}^2) \qquad (1);$$

wherein $S_i$ is a d×1 column vector of the first text; $T_j$ is a d×1 column vector of the second text; $\alpha_{i,j}$ is parameter for semantic overlay calculation; $\lambda>0$; and $\lambda$ is a positive real number.

11. The apparatus of claim 10, wherein the memory further stores computer-executable instructions for controlling the one or more processors to, subsequent to respectively mapping the first text and the second text to vectors, perform dimension reduction on the vectors, thereby representing the first text and the second text respectively using low-dimension dense vectors.

12. The apparatus of claim 10, wherein the memory further stores computer-executable instructions for controlling the one or more processors to perform a semantics decomposition on the first text and the second text thereby determining the similar part and dissimilar part.

13. A data query apparatus, comprising the apparatus for calculating relevancy of claim 10.

14. A data query method, comprising calculating relevancy between a first text and a second text according to the method of claim 1, the second text being a text selected from a plurality of potential target texts;

ranking the plurality of potential target texts based on calculation of relevancy between the plurality of potential target texts and the first text; and selecting a target text out of the plurality of potential target texts based on a resulting of ranking the plurality of potential target texts.

15. A non-transitory computer-readable storage medium storing computer-readable instructions, the computer-readable instructions being executable by a processor to cause the processor to perform:

respectively mapping a first text and a second text to vectors;

determining a similar part and a dissimilar part between the first text and the second text based on the vectors; and calculating a relevancy between a first text and a second text using both the similar part and the dissimilar part;

wherein determining the similar part and dissimilar part comprises performing a semantic content analysis based on the first text and the second text;

wherein the semantic content analysis comprises performing a semantic matching process between the first text and the second text thereby obtaining a semantic overlay between the first text and the second text;

wherein performing the ccmatic semantic matching process comprises:

reconstructing a vector of a word in the first text using word vectors of the second text; and calculating the semantic overlay based on a result of the reconstructing;

wherein the semantic overlay is calculated based on Equation (1):

$$\min(\|S_i - \Sigma_{j=1}^m \alpha_{i,j} \times T_j\|^2 + \lambda \Sigma_{j=1}^m \alpha{i,j}^2) \qquad (1);$$

wherein $S_i$ is a d×1 column vector of the first text; $T_j$ is a d×1 column vector of the second text; $\alpha_{i,j}$ is parameter for semantic overlay calculation; $\lambda>0$; and $\lambda$ is a positive real number.

* * * * *